United States Patent
Zhong et al.

(10) Patent No.: US 10,907,687 B2
(45) Date of Patent: Feb. 2, 2021

(54) LUBRICATION GROOVE FOR DEEP GROOVE BALL BEARING

(71) Applicant: Schaeffler Technologies AG & Co. KG, Herzogenaurach (DE)

(72) Inventors: Guihui Zhong, Charlotte, NC (US); Marion Jack Ince, Mount Holly, NC (US); Venkata Kottapalli, Fort Mill, SC (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 16/813,077

(22) Filed: Mar. 9, 2020

(65) Prior Publication Data

US 2020/0208682 A1 Jul. 2, 2020

Related U.S. Application Data

(63) Continuation of application No. 16/101,851, filed on Aug. 13, 2018, now Pat. No. 10,612,595.

(51) Int. Cl.
| | |
|---|---|
| F16C 33/58 | (2006.01) |
| F16C 33/66 | (2006.01) |
| F16C 37/00 | (2006.01) |
| F16C 35/067 | (2006.01) |
| F16C 19/06 | (2006.01) |

(52) U.S. Cl.
CPC ............ *F16C 33/586* (2013.01); *F16C 19/06* (2013.01); *F16C 33/6651* (2013.01); *F16C 35/067* (2013.01); *F16C 37/007* (2013.01)

(58) Field of Classification Search
CPC .......................... F16C 33/586; F16C 33/6614; F16C 33/6651; F16C 35/063; F16C 35/067; F16C 37/007
See application file for complete search history.

(56) References Cited

U.S. PATENT DOCUMENTS

| | | | |
|---|---|---|---|
| 5,028,152 | A | 7/1991 | Hill et al. |
| 7,579,741 | B2 | 8/2009 | Morikaku et al. |
| 8,684,608 | B2 | 4/2014 | Ince et al. |
| 9,234,548 | B2 | 1/2016 | Frank |
| 9,366,295 | B2 | 6/2016 | Sebald et al. |
| 2009/0080824 | A1 | 3/2009 | Joki et al. |
| 2012/0093453 | A1 | 4/2012 | Horvat |
| 2012/0328226 | A1 | 12/2012 | Gloeckner et al. |

FOREIGN PATENT DOCUMENTS

| | | |
|---|---|---|
| DE | 19847206 A1 | 4/2000 |
| JP | 2005-195108 | * 7/2005 |

* cited by examiner

*Primary Examiner* — James Pilkington
(74) *Attorney, Agent, or Firm* — Volpe Koenig (57) ABSTRACT

An outer ring for a deep groove ball bearing assembly is disclosed. The outer ring includes a radially inner surface defining a raceway, and a radially outer surface defining a single groove extending between axial ends of the outer ring. The single groove contacts at least one axial end face of the outer ring.

5 Claims, 9 Drawing Sheets

LUBRICATION GROOVE FOR DEEP GROOVE BALL BEARING

INCORPORATION BY REFERENCE

This application is a continuation of U.S. patent application Ser. No. 16/101,851, filed Aug. 13, 2018, which is incorporated by reference as if fully set forth.

FIELD OF INVENTION

The present invention relates to a deep groove ball bearing.

BACKGROUND

Deep groove ball bearings are well known, particularly in the automotive field. Deep groove ball bearings are used in automotive transmissions, especially for continuously variable transmissions or hybrid transmission or e-axles. These known types of bearings experience creep due to high speed and heavy loads. In particular, the outer bearing ring experiences creep, which causes fretting and wear in the outer housing, typically formed from aluminum.

Known solutions for addressing bearing creep include applying a coating to the bearing components, or require the use of an angular contact bearing with a biasing element to provide a preload. These solutions are relatively expensive and require additional assembly steps and handling.

Known solutions for addressing creep or thermal expansion of bearing assemblies are disclosed in US Pub 2012/0093453; U.S. Pat. Nos. 8,684,608; 5,028,152; and US Pub. 2009/0080824.

It would be desirable to provide a cost-effective solution for addressing fretting and wear in deep groove ball bearings that does not affect load capacity and is relatively simple to assemble.

SUMMARY

An outer ring for a deep groove ball bearing assembly is disclosed. The outer ring includes a radially inner surface defining a raceway, and a radially outer surface defining a single groove extending between axial ends of the outer ring. The single groove contacts at least one axial end face of the outer ring.

BRIEF DESCRIPTION OF THE DRAWINGS

The foregoing Summary and the following detailed description will be better understood when read in conjunction with the appended drawings, which illustrate a preferred embodiment of the invention. In the drawings.

DETAILED DESCRIPTION OF THE PREFERRED EMBODIMENTS

Certain terminology is used in the following description for convenience only and is not limiting. The words "front," "rear," "upper" and "lower" designate directions in the drawings to which reference is made. The words "inwardly" and "outwardly" refer to directions toward and away from the parts referenced in the drawings. "Axially" refers to a direction along the axis of a shaft. A reference to a list of items that are cited as "at least one of a, b, or c" (where a, b, and c represent the items being listed) means any single one of the items a, b, or c, or combinations thereof. The terminology includes the words specifically noted above, derivatives thereof and words of similar import.

Figure 1A:
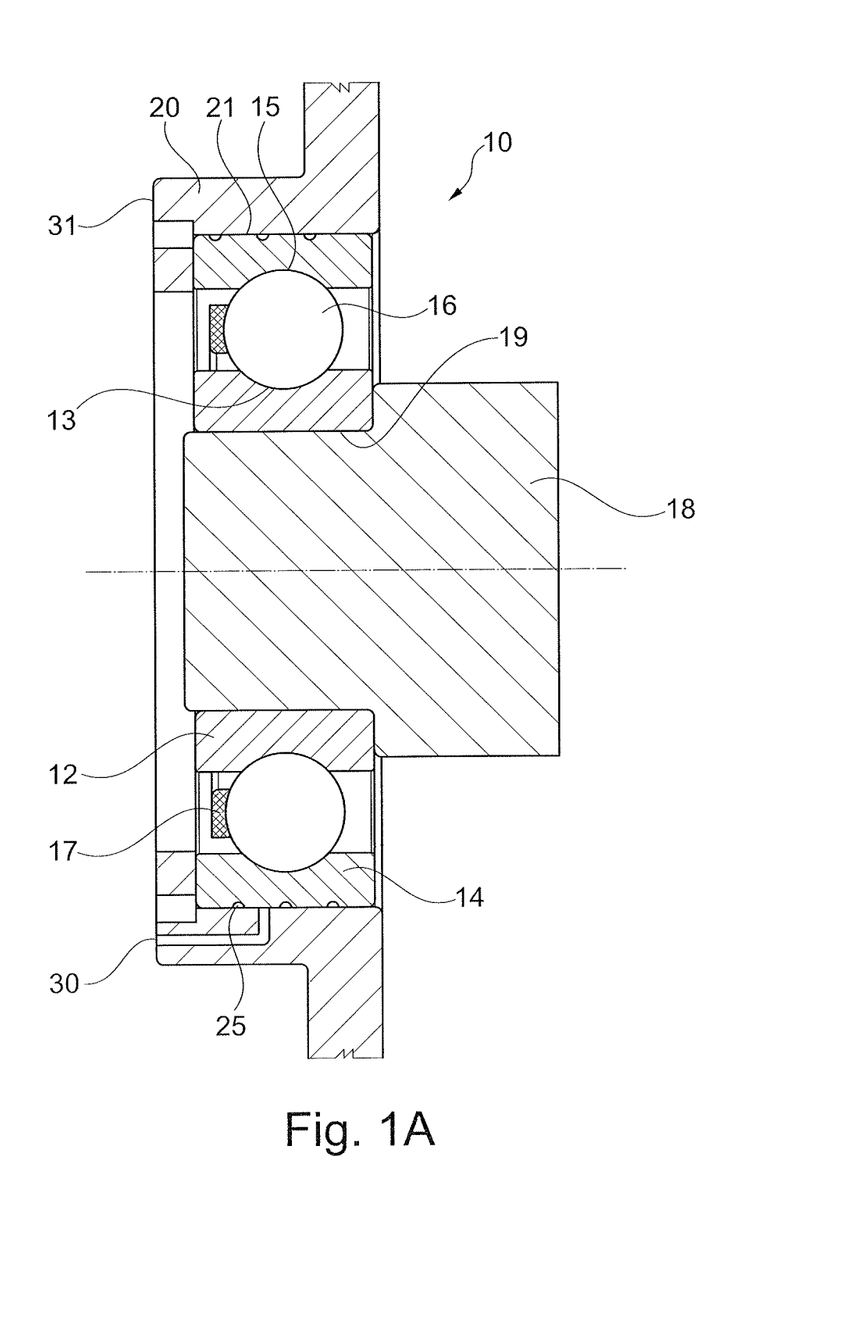
FIG. 1A is a cross-sectional view of a deep groove ball bearing including grooves formed in an outer bearing ring.
Figure 1B:
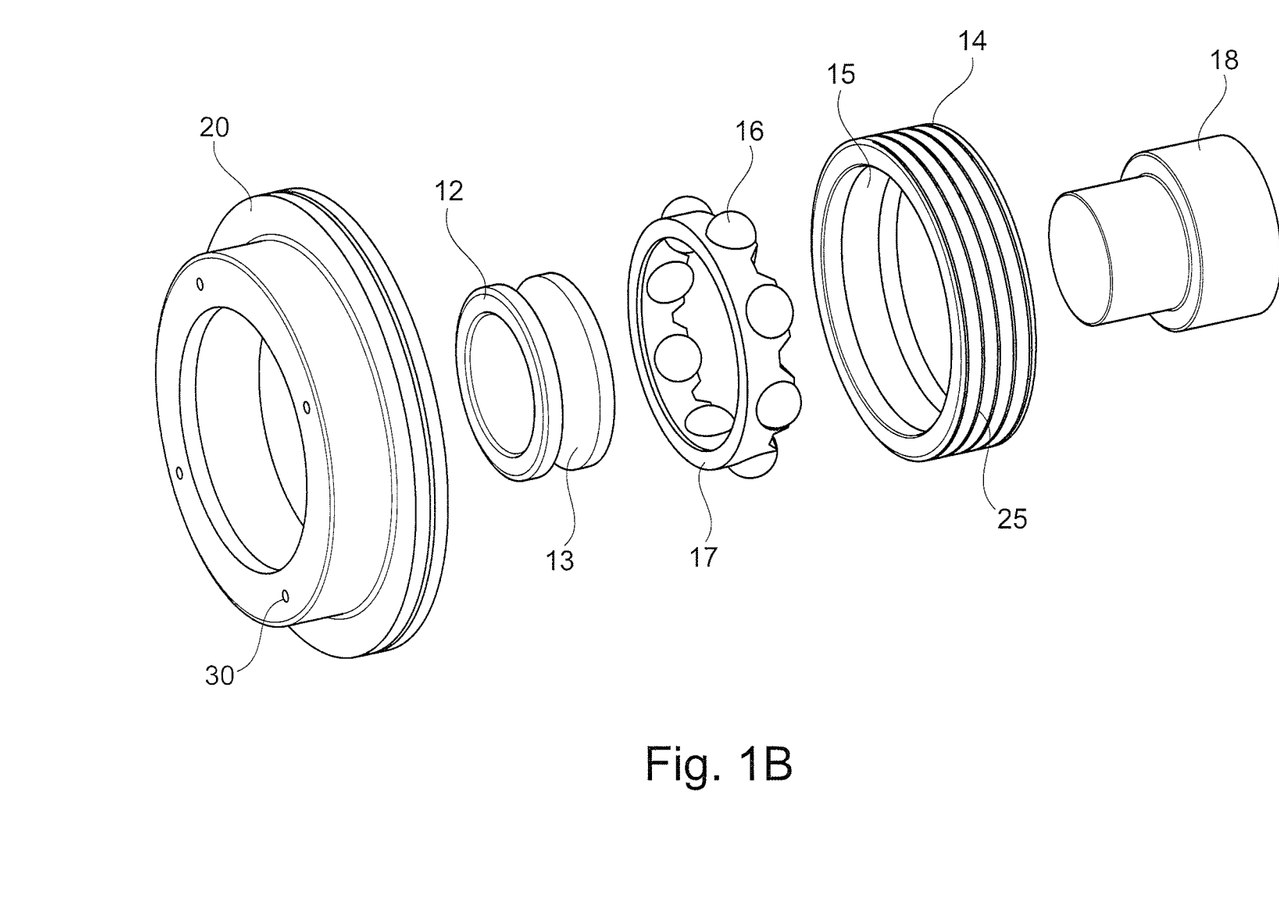
FIG. 1B is an exploded view of the deep groove ball bearing of FIG. 1A.
Figure 1C:
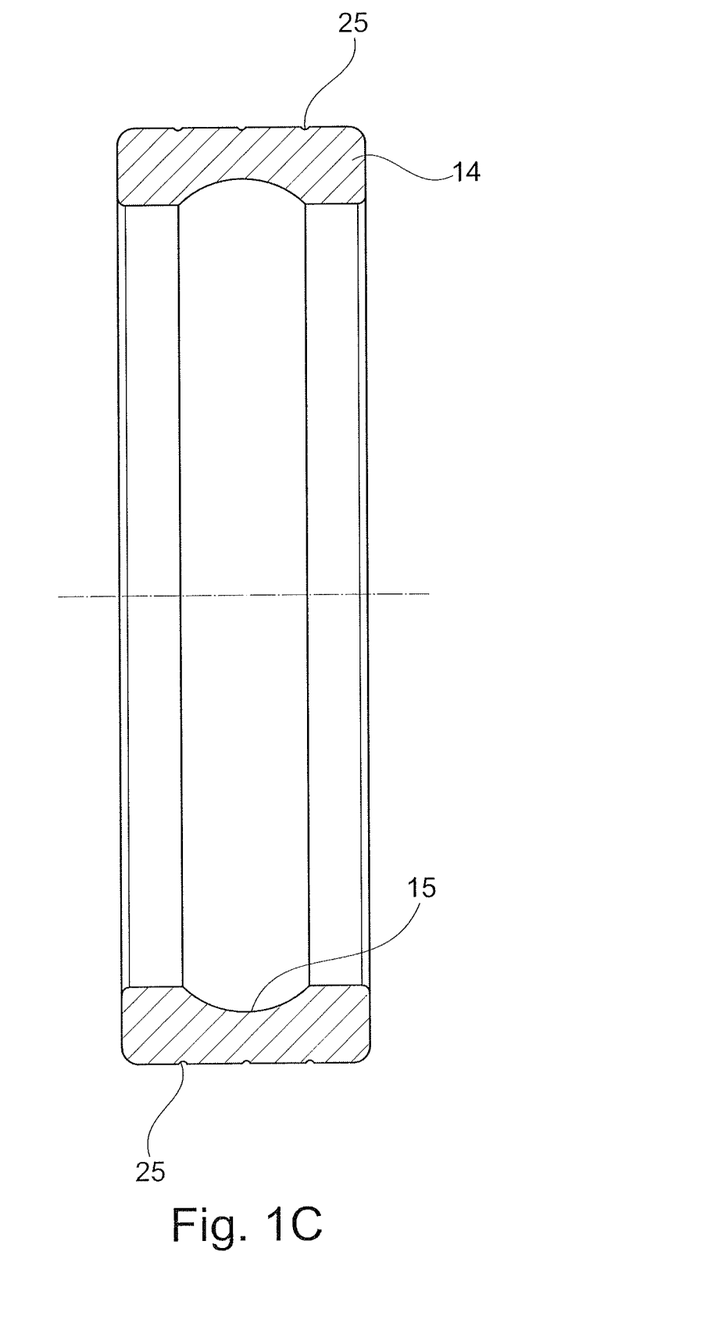
FIG. 1C is a cross-sectional view of an outer bearing ring of the deep groove ball bearing of FIG. 1A.

Referring to FIGS. 1A-1C, a first embodiment of a deep groove ball bearing assembly 10 is illustrated. The deep groove ball bearing assembly 10 includes an inner bearing ring 12 defining an inner race 13, an outer bearing ring 14 defining an outer race 15, and a plurality of rolling elements 16 supported on the inner race 13 and the outer race 15. The rolling elements 16 can be supported by a cage 17. A shaft 18 is supported on a radially inner surface 19 of the inner bearing ring 12. A housing 20 is supported on a radially outer surface 21 of the outer bearing ring 14. Generally, a contact surface is defined of at least one of: the inner bearing ring 12, the outer bearing ring 14, the shaft 18, or the housing 20. The contact surface includes at least one lubrication groove 25.

The lubrication groove 25 addresses fretting and wear problems in deep groove ball bearings but reducing contact areas between facing contact surfaces, while avoiding any negative impact on load capacity or expensive coating materials. The lubrication groove 25 also provides a more reliable supply of lubricant to facing contact surfaces, which reduces fretting and wear.

Specifically, as shown in FIGS. 1A-1C, the grooves 25 are formed in the outer bearing ring 14. As shown in FIGS. 1A-1C, the housing 20 includes a lubrication conduit 30. The lubrication conduit 30 extends from an end face 31 of the housing 20 and extends to a radially inner surface of the housing 20 that faces the grooves 25 on the outer bearing ring 14.

In the embodiment of FIGS. 1A-1C, the outer bearing ring 14 can have an increased outer diameter compared to existing out bearing rings that lack any lubrication grooves 25. In one embodiment, the outer diameter of the outer bearing ring 14 is increased 1.0-2.0 mm compared to existing bearing rings to help further reduce creep.

Figure 2A:
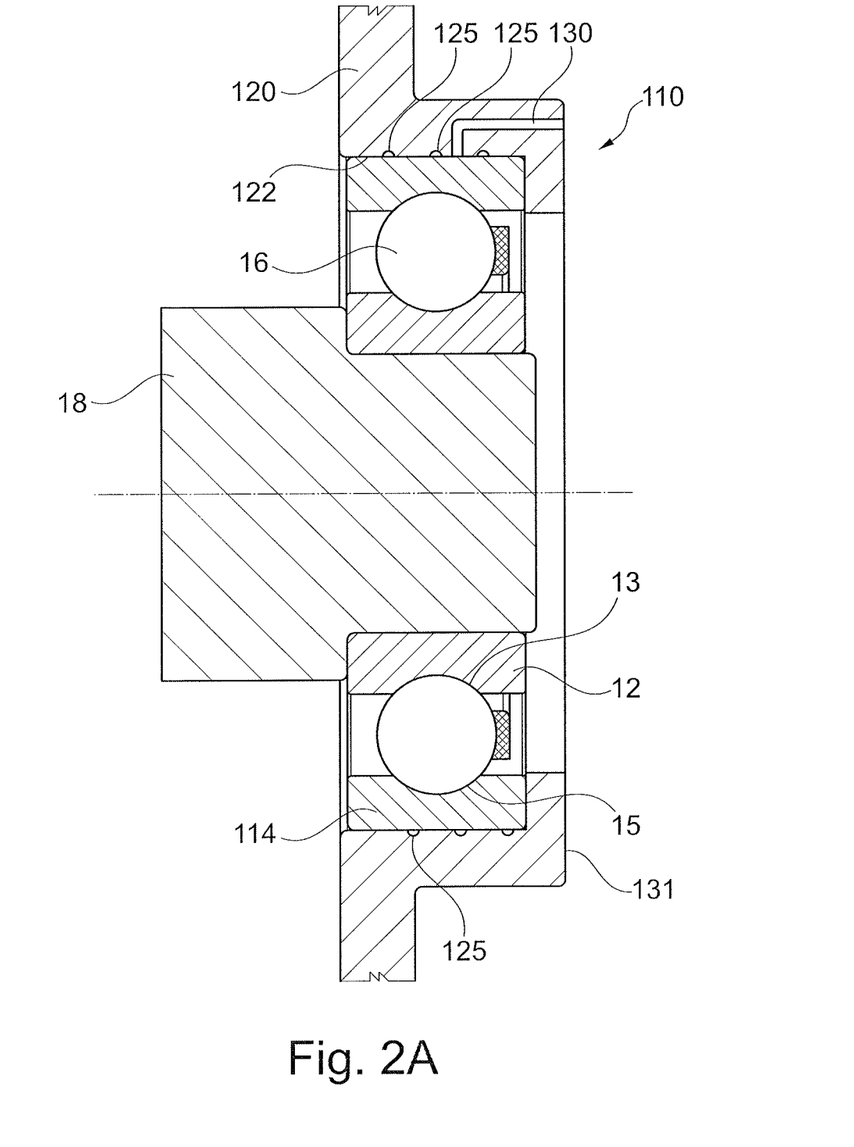
FIG. 2A is a cross-sectional view of a deep groove ball bearing including grooves formed in a housing.
Figure 2B:
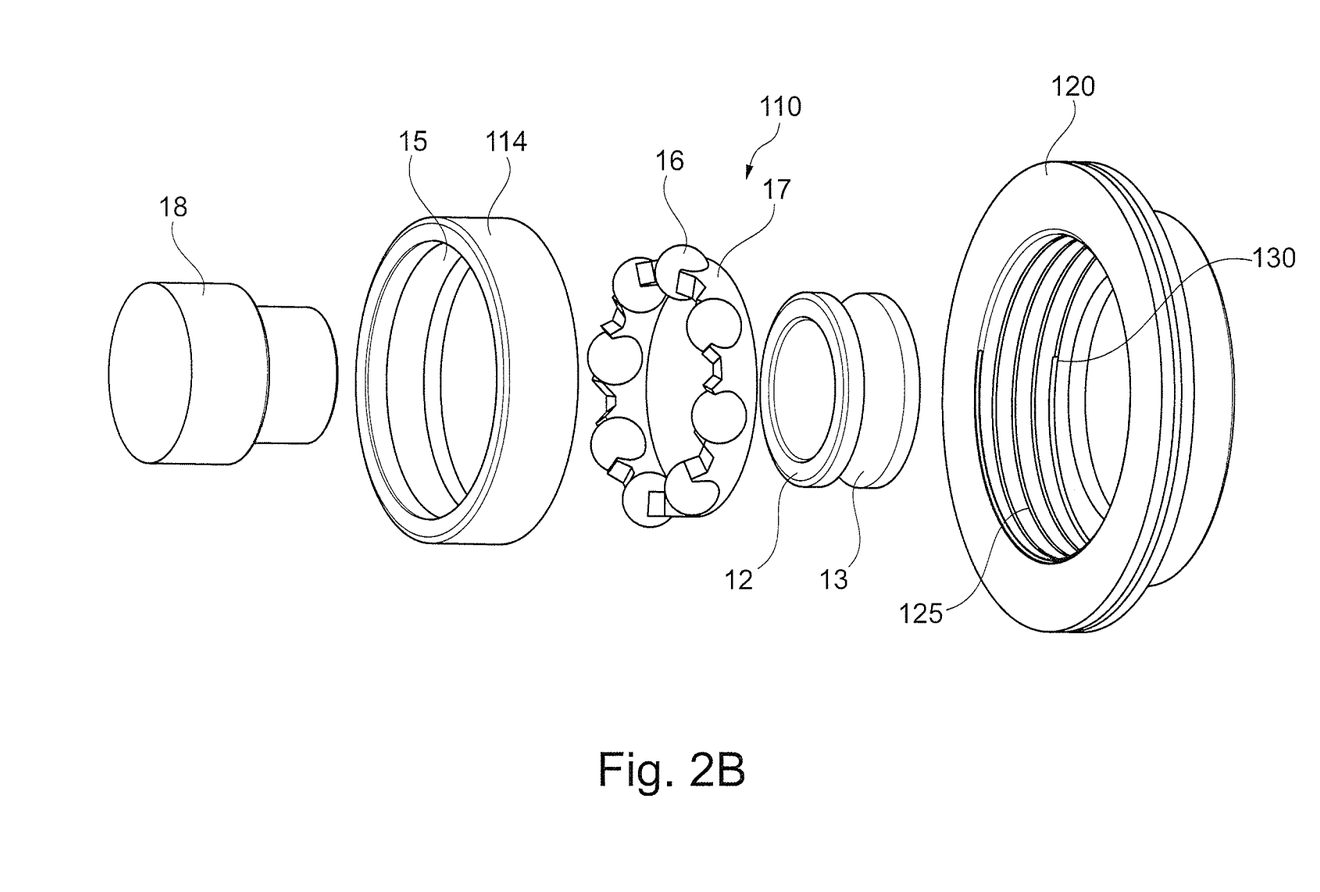
FIG. 2B is an exploded view of the deep groove ball bearing of FIG. 2A.

As shown in FIGS. 2A and 2B, a second embodiment of a deep groove ball bearing 110 is illustrated. Similar features from FIGS. 1A-1C are indicated by identical reference numerals. In this embodiment, the housing 120 includes the lubrication grooves 125 on a contact surface facing the outer bearing ring 114. As shown in FIG. 2A, the housing 120 also includes the lubrication conduit 130 extending from an outer surface 131 to a contact surface of the housing 120 defining the lubrication grooves 125.

In this embodiment, a contact surface 122 of the housing 120 has a first axial extent ($d_1$), the at least one groove 125 includes a plurality of grooves 125, and the plurality of grooves have a second axial extent (i.e. a sum of each individual axial extent of each groove) that is at least 15% of the first axial extent ($d_1$). In one embodiment, the second axial extent is 15%-33% of the first axial extent ($d_1$).

Figure 3A:
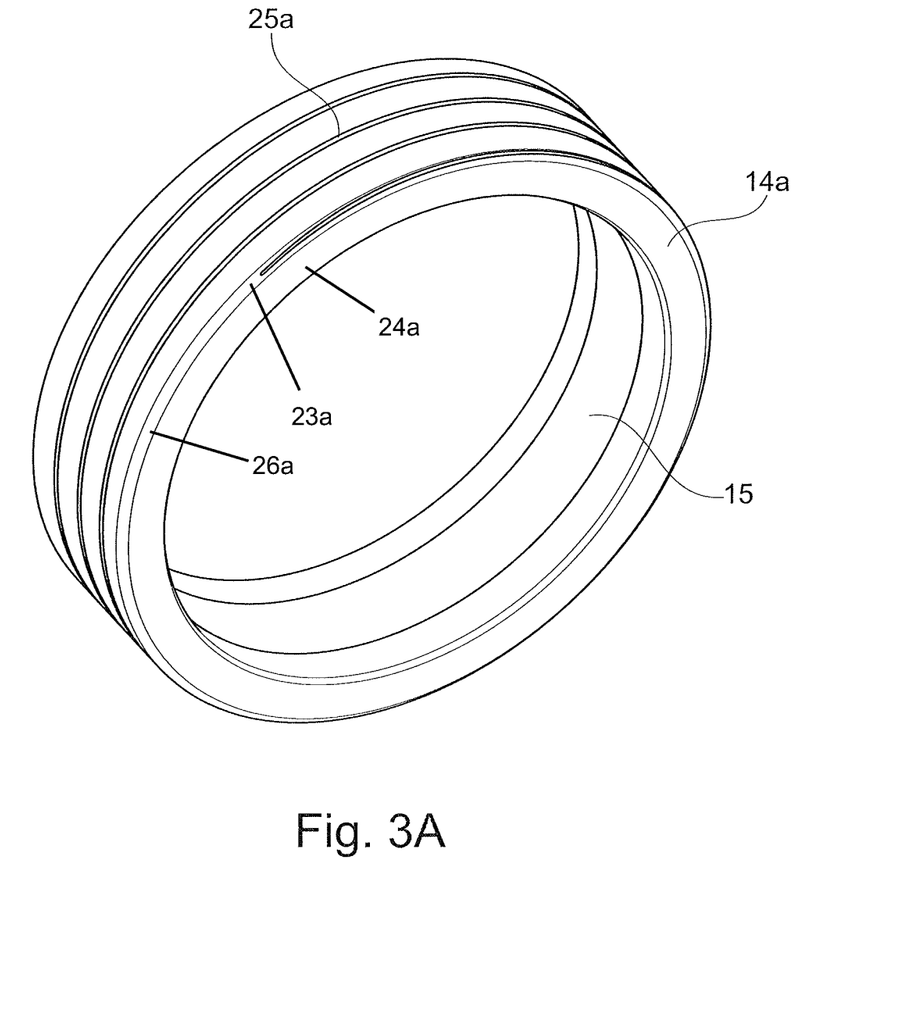
FIG. 3A is a perspective view of an outer bearing ring according to another embodiment.
Figure 3B:
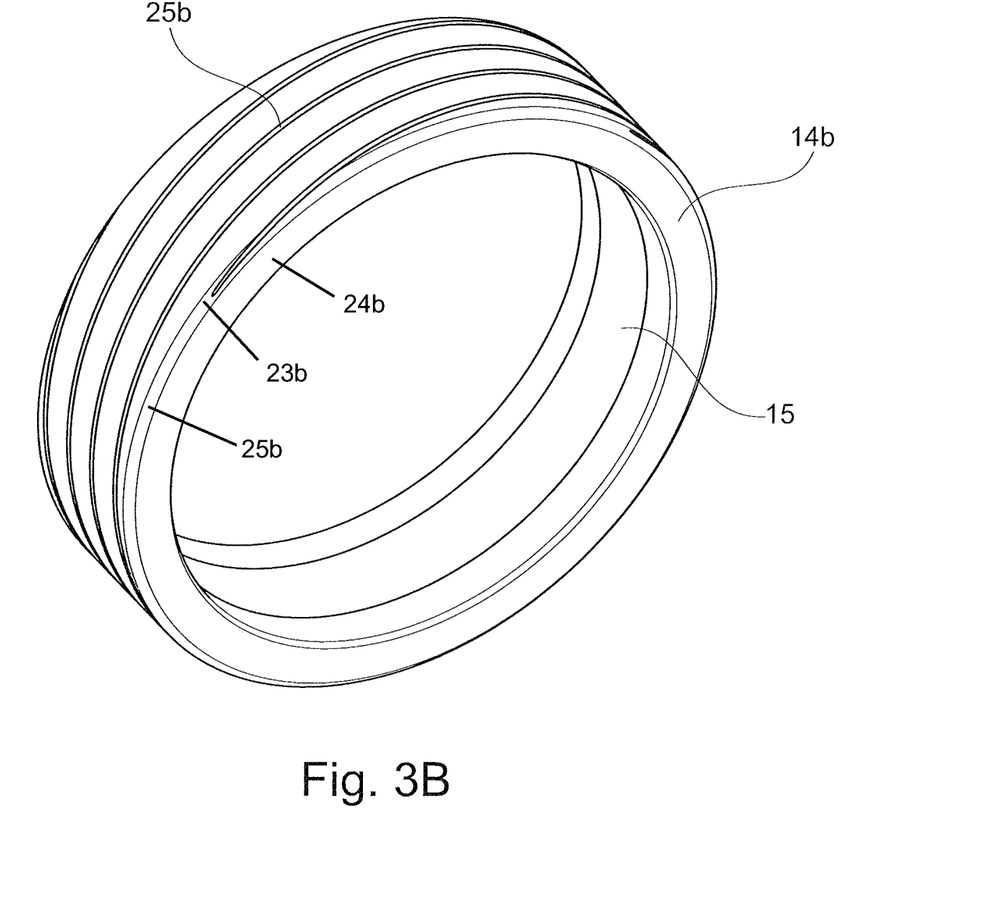
FIG. 3B is a perspective view of an outer bearing ring according to another embodiment.

In one embodiment, the grooves 25a, 25b are angled relative to a circumferential plane. FIGS. 3A and 3B illustrate grooves 25a, 25b formed on a radially outer surface of an outer bearing ring 14a, 14b. A pitch of the grooves 25a in FIG. 3A is 4-6 mm. A pitch of the grooves 25b in FIG. 3B is 18-20 mm. One of ordinary skill in the art would recognize that the pitch, size, quantity, and other variables regarding the grooves 25a, 25b can be varied depending on a specific application's requirements. As shown in FIG. 3A, the at least one groove 25a includes a single groove extending for at least three revolutions. As shown in FIG. 3B, the at least one groove 25b includes at least three grooves, and each of the at least three grooves extends for a single revolution. The bearing rings 14a, 14b each include at least one axial end face 23a, 23b consisting of a vertical portion 24a, 24b and a chamfered portion 26a, 26b. Each of the grooves 25a, 25b contact the at least one axial end face 23a, 23b of the bearing ring 14a, 14b.

Figure 3C:
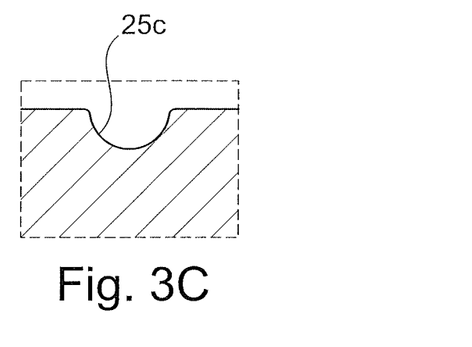
FIGS. 3C-3G are cross-sectional views of grooves according to varying embodiments.
Figure 3D:
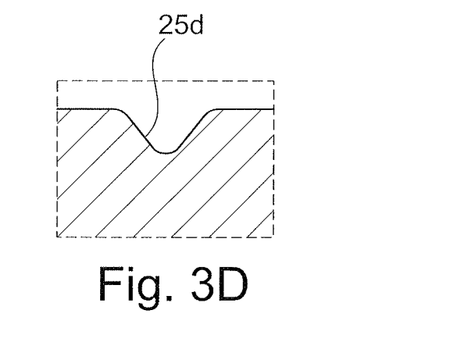
Figure 3E:
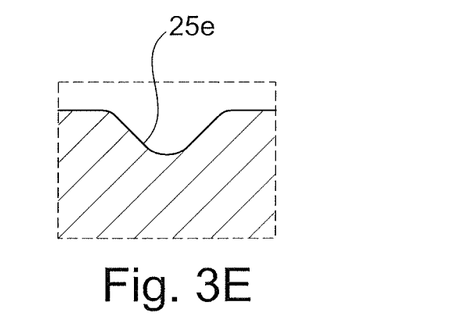
Figure 3F:
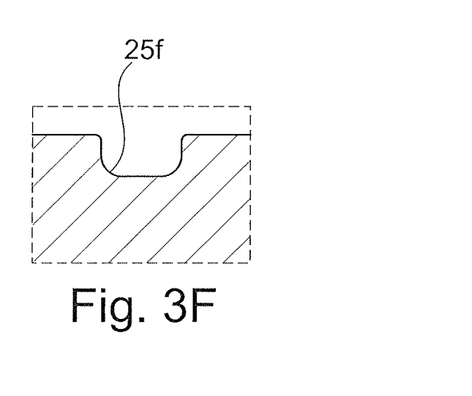
Figure 3G:
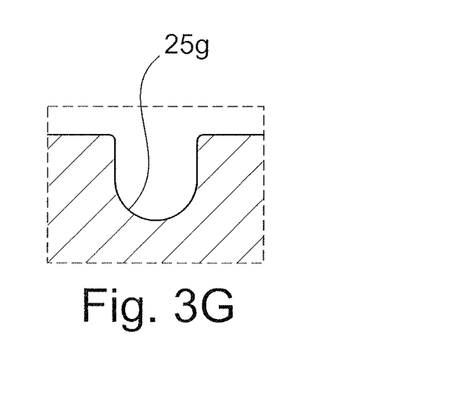

As shown in FIGS. 3C-3G, the profile of the grooves 25c-25f can be varied. In FIG. 3C, the groove 25c has a generally curved, half-circle profile. In FIG. 3D, the groove 25d includes a generally triangular profile with curved edges. In FIG. 3E, the groove 25e has a generally trapezoidal profile with a relatively flat base surface. The groove 25f of FIG. 3F includes a generally rectangular profile with flat side surfaces and a flat base surface. The groove 25g of FIG. 3G has a similar profile as groove 25c but has a deeper profile with elongated side wall surfaces.

Figure 4:
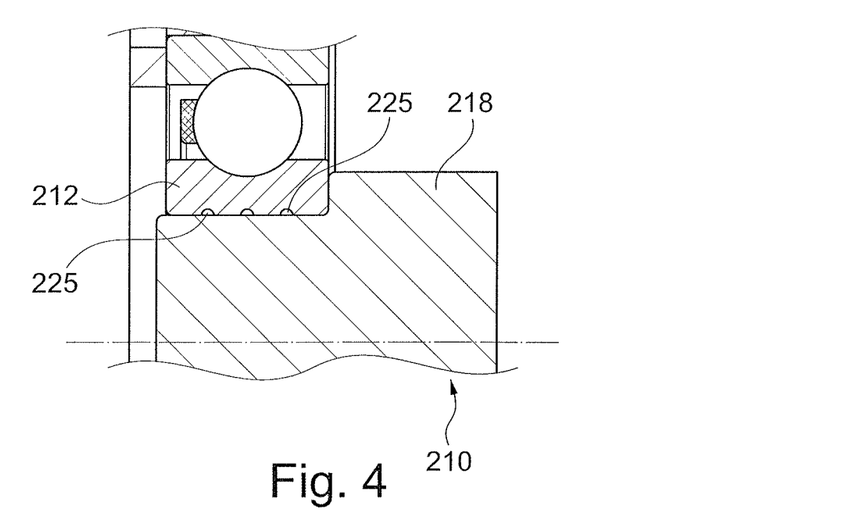
FIG. 4 is a cross-sectional view of a deep groove ball bearing including grooves formed in an inner bearing ring.

FIG. 4 illustrates an alternative embodiment of a deep groove ball bearing 210 in which the lubrication grooves 225 are formed on a radially inner surface of the inner bearing ring 212, and the lubrication grooves 225 face the shaft 218.

Figure 5:
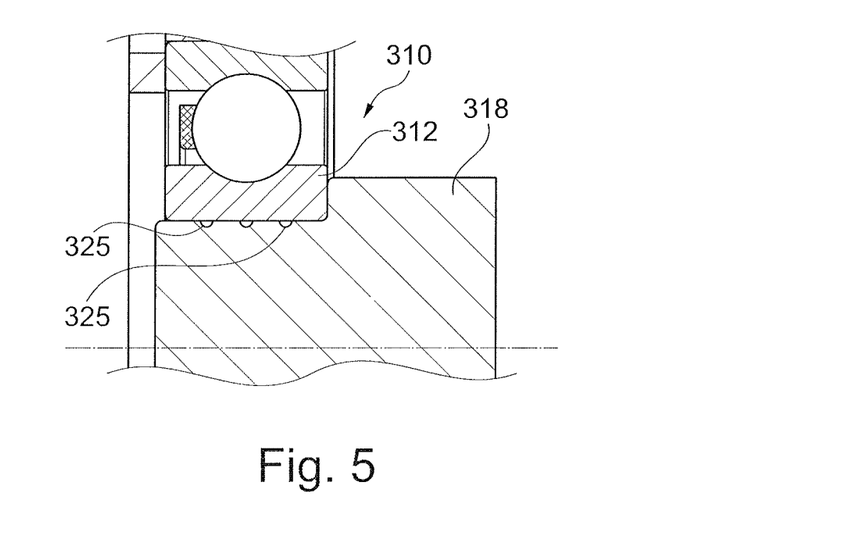
FIG. 5 is a cross-sectional view of a deep groove ball bearing including grooves formed in a shaft.

FIG. 5 illustrates an alternative embodiment of a deep groove ball bearing 310 in which lubrication grooves 325 are formed on a radially outer surface of the shaft 318, and the lubrication grooves 325 face the inner bearing ring 312.

One of ordinary skill in the art would recognize from the present disclosure that lubrication grooves can be formed on any of the contact surfaces of the deep groove ball bearing assembly. These lubrication grooves reduce fretting and wear, which negatively impact performance of the deep groove ball bearing assemblies.

Having thus described the present invention in detail, it is to be appreciated and will be apparent to those skilled in the art that many physical changes, only a few of which are exemplified in the detailed description of the invention, could be made without altering the inventive concepts and principles embodied therein. It is also to be appreciated that numerous embodiments incorporating only part of the preferred embodiment are possible which do not alter, with respect to those parts, the inventive concepts and principles embodied therein. The present embodiment and optional configurations are therefore to be considered in all respects as exemplary and/or illustrative and not restrictive, the scope of the invention being indicated by the appended claims rather than by the foregoing description, and all alternate embodiments and changes to this embodiment which come within the meaning and range of equivalency of said claims are therefore to be embraced therein.

What is claimed is:

1. An outer ring for a deep groove ball bearing assembly, the outer ring comprising:
   a radially inner surface defining a raceway;
   a radially outer surface defining a single groove extending between axial ends of the outer ring; and
   at least one axial end face including a vertical portion and a chamfered portion,
   wherein the single groove contacts at least the chamfered portion of the at least one axial end face of the outer ring, and the single groove extends for a plurality of revolutions.

2. The outer ring of claim 1, wherein the single groove is a pitched groove having a pitch of 4-6 mm or 18-20 mm.

3. An outer ring for a deep groove ball bearing assembly, the outer ring comprising:
   a radially inner surface defining a raceway;
   a radially outer surface defining a single groove extending between axial ends of the outer ring; and
   at least one axial end face including a vertical portion and a chamfered portion,
      wherein the single groove contacts the chamfered portion of the at least one axial end face of the outer ring,
      the single groove is angled relative to a circumferential plane, and the single groove extending for at least three revolutions.

4. A deep groove ball bearing assembly including the outer ring of claim 3, the deep groove ball bearing assembly further comprising an outer housing defining a conduit, wherein the conduit terminates in a region of the outer ring between the at least three revolutions.

5. The outer ring of claim 3, wherein the at least three revolutions of the single groove have a pitch of 4 mm-6 mm.

* * * * *